United States Patent [19]
Marcusen

[11] Patent Number: 5,316,255
[45] Date of Patent: May 31, 1994

[54] VACUUM CONTAINER HOLDER

[75] Inventor: David P. Marcusen, Fennville, Mich.

[73] Assignee: Prince Corporation, Holland, Mich.

[21] Appl. No.: 818,793

[22] Filed: Jan. 9, 1992

[51] Int. Cl.⁵ ............................................. F16M 13/00
[52] U.S. Cl. ................... 248/362; 248/309.3; 248/311.2; 269/21
[58] Field of Search ...................... 248/362, 363, 311.2, 248/205.8, 205.9, 309.3; 279/3; 269/21

[56] References Cited

U.S. PATENT DOCUMENTS

| | | | |
|---|---|---|---|
| 2,535,952 | 12/1950 | Partridge | 248/363 |
| 2,572,640 | 10/1951 | Lovegrove | 248/363 |
| 3,004,766 | 10/1961 | Bryant | 279/3 |
| 4,040,549 | 8/1977 | Sadler | 248/311.2 X |
| 4,892,296 | 1/1990 | Jelinek | 269/21 |
| 4,919,381 | 4/1990 | Buist | 248/311.2 X |

Primary Examiner—David L. Talbott
Attorney, Agent, or Firm—Price, Heneveld, Cooper, DeWitt & Litton

[57] ABSTRACT

A vacuum operated container holder includes a support having a valve actuated vacuum source coupled thereto for selectively applying a vacuum to a resilient horizontally extending container support member for holding a container in place thereon. In a preferred embodiment of the invention, the container holder valve is actuated by the placement of a container on the support platform and rotating the container to activate or deactivate the valve which couples the support platform to a vacuum source using a natural wrist motion.

26 Claims, 2 Drawing Sheets

VACUUM CONTAINER HOLDER

BACKGROUND OF THE INVENTION

The present invention pertains to a container holder for a vehicle and particularly one which employs a vacuum source for operation.

Container holders for vehicles have become a popular accessory to allow, for example, a driver or passenger of a vehicle to enjoy a cup of coffee or soft drink in relative safety when both hands are needed. The container can be placed in a holder which frees the hands of the user for driving activities when not actually drinking from the container. There have been a variety of container holders which accommodate cans, mugs, Styrofoam cups and other containers for such purpose. Frequently the arms of the container holders are either adjustable or flexible in some manner to accommodate different container shapes. The primary difficulty with holding a variety of containers is that the diameter and/or sidewall taper of the containers can vary greatly from container to container thereby requiring a container holder with somewhat complicated mechanical arms or other structure to accommodate the varying shape of the containers now in common use. The disadvantage of such prior systems is the complexity required which not only increases the cost of the container holders but also increases the possibility of mechanical failure due to the many moving parts common in several container holder designs.

One common parameter for all containers be they cups, cans, mugs or the like is that they all either have a flat bottom or a bottom with a ring which forms a flat ring support for the container when resting on a substantially flat surface. This common design feature in all containers has not, to date, been recognized as one which can be utilized as a design parameter for the design of a uniform cupholder which relies entirely upon this design parameter for its holding mechanism.

SUMMARY OF THE PRESENT INVENTION

The system of the present invention overcomes the difficulty of prior art container holders which utilize a variety of somewhat complicated shapes and moveable arms and the like and accommodates all manner and shapes of containers including mugs with handles which frequently interfere with commonly available container holders by providing a support having a valve actuated vacuum source coupled thereto for selectively applying a vacuum to a resilient sealable horizontally extending container support member for holding the container in place thereon.

In a preferred embodiment of the invention, the container holder valve is actuated by the placement of a container on the support platform and rotating the container and the platform to activate or deactivate the valve Which couples the support platform to a vacuum source using a natural wrist motion. Thus, the system of the present invention provides a container holder which can be readily mounted in a compact space and does not require complicated mechanical arms or the like for supporting the side walls of a container. The container holder presents a substantially flush-flat surface when mounted in a vehicle and therefore, need not be moved between stored and use positions since its appearance will conform to that of modern vehicle designs. These and other features, objects and advantages of the present invention will become apparent upon reading the following description thereof together with reference to the accompanying drawings in which:

DETAILED DESCRIPTION OF THE PREFERRED EMBODIMENT

Figure 1:
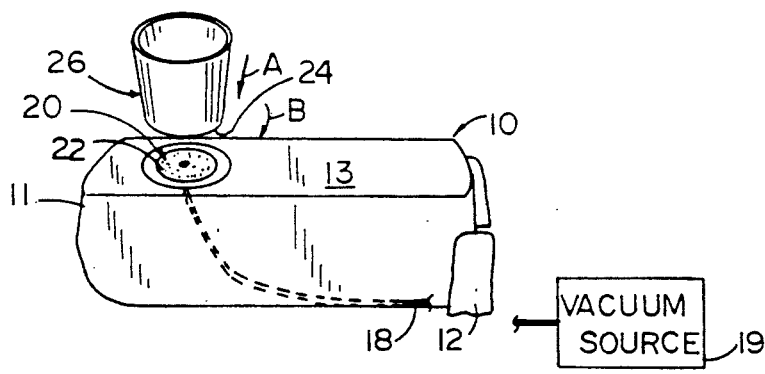
FIG. 1 is a perspective view of a vehicle armrest embodying the container holder of the present invention.
Figure 3:
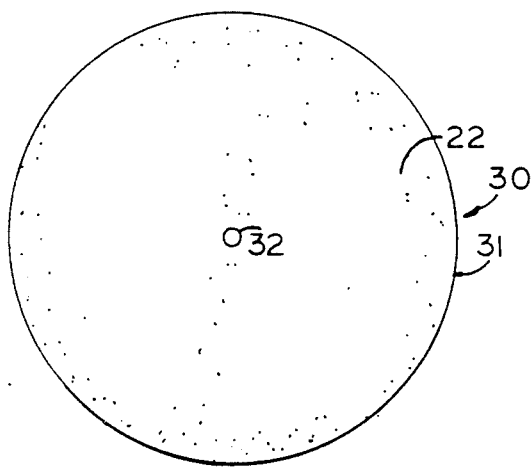
FIG. 3 is a top plan view of the support disc shown in FIGS. 1 and 2.
Figure 8:
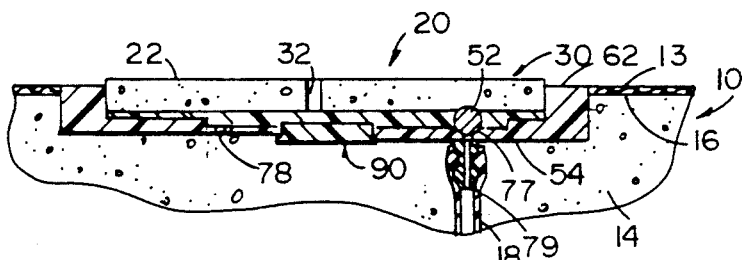
FIG. 8 is a fragmentary vertical cross-sectional view of the container holder assembly taken along section lines VIII—VIII of FIG. 1.

Referring initially to FIG. 1, there is shown an armrest 10 which integrally includes a vacuum actuated container holder assembly 20 of the present invention which is mounted to the forward end 11 thereof. Armrest 10 is mounted to a vehicle such as an automobile in a conventional manner using a mounting bracket assembly 12 and can pivot between a lowered use position as shown in FIG. 1 to a raised stored position between the front or rear seats of the vehicle depending on the installation. Vehicles with multiple armrests may each include a container holder assembly mounted therein. As best seen in FIGS. 1 and 8, the container holder assembly 20 is substantially flush with the top surface 13 of armrest 10. The armrest 10 will typically include a foam polymeric body 14 covered by an upholstery material 16 to provide an appearance which blends to that of the interior of the vehicle. The container holder assembly 20 can be mounted to other vehicle locations such as a console mounted to the vehicle, side armrests, the dashboard area, or other suitable locations.

The container holder 20 is coupled by means of a vacuum hose 18 to a vacuum source 19 which can be a standard vacuum reservoir utilized in vehicles having pneumatic actuated controls or coupled to a separate relatively small vacuum pump. In the preferred embodiment, the vacuum source provided a negative pressure of approximately 600 mm (i.e. 160 mm below atmospheric pressure). As will be explained in greater detail hereinafter, the vacuum container holder assembly 20 provides an upper resilient surface 22 which receives the lower disc shape surface or the rim 24 of a container 26 such as a cup, mug, can or the like and holds the bottom surface 24 against the support surface 22 when a container is placed downwardly on the surface as indicated by Arrow A in FIG. 1 through the negative pressure created between the lower surface of the container 26 and the upper surface 22 of the support 30. Selective holding of container 26 is achieved by interrupting the vacuum and venting the surface 22 to the atmosphere so that the container can be lifted from the container holder. In the embodiment shown herein, rotation of the container 26 in a clockwise direction indicated by Arrow B releases a container for use while rotating the container on the rotating support member 30 in a counterclockwise direction (opposite Arrow B) applies the vacuum to the lower surface 24 of the container for holding the container in position on support 30. Having briefly described the environment and concept of operation of the vacuum actuated container holder of the present invention, a description of the structural elements forming the container holder and their operation is now presented.

Figure 2:
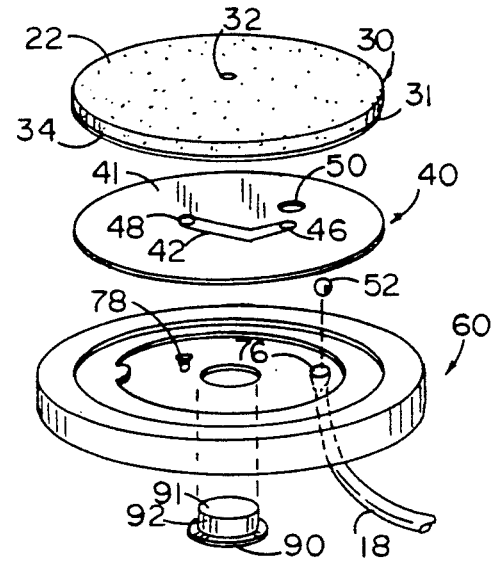
FIG. 2 is an exploded perspective view of the container holder embodying the present invention.

The container holder assembly 20 of the present invention includes three major structural components including the support disc 30 which is attached to a rotatable valve plate 40 which in turn is rotatably mounted within a support housing 60 as best seen in FIGS. 2 and 8. A description of the construction of each of these elements is first presented followed by a description of operation of the container holder once assembled. The support disc 30 is made of a resilient polymeric material such that the upper surface 22 will sealably mate to the lower surface 24 of a wide variety of containers. In the preferred embodiment of the invention, the support disc 30 was made of a cellular urethane such as PORON ® and had a diameter of approximately 3" and a thickness of about 0.1". The consistency of this material is such that it presents a firm but resilient upper surface 22 to which the lower surface of container 26 can conform. A central aperture 32 is formed in the disc-shaped body 31 of support disc 30 and is aligned with and communicates with a vacuum manifold slot 42 formed in the upper surface 41 of valve plate 40. Aperture 32 has a diameter of approximately 0.05" and is centrally located within the disc to align with the center of manifold 42. The lower surface 34 of support disc 30 includes a self-sticking adhesive such that the disc is permanently attached to the upper surface 41 of valve plate 40 upon assembly. Depending upon the pressure within manifold 42, either a vacuum will be applied through aperture 32 to the lower surface of container 26 for holding the container in place on the support surface 22 which extends slightly above the surface 13 of armrest 10 as best seen in FIG. 8, or the manifold will be vented to the atmosphere through the body of armrest 10 to relieve the holding force on the container so it can be removed from the container holder for use.

Figure 4:
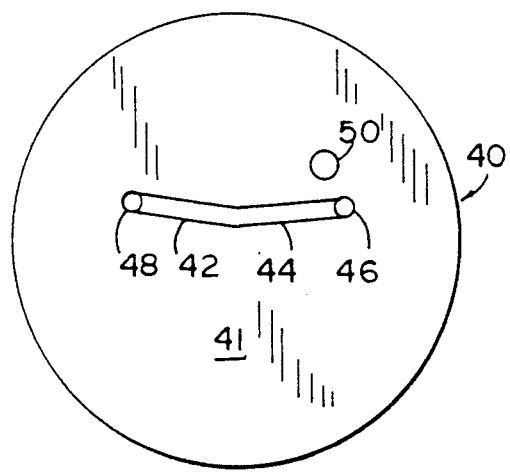
FIG. 4 is a top plan view of the valve plate shown in FIG. 2.
Figure 5:
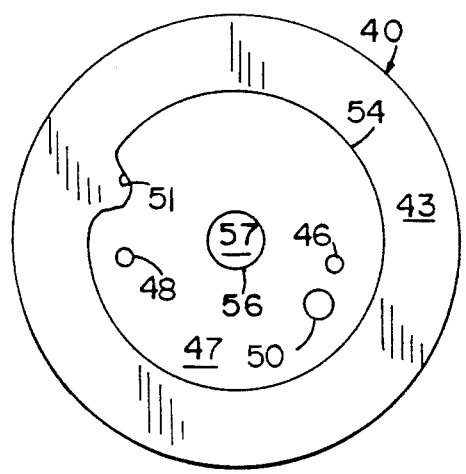
FIG. 5 is a bottom plan view of the valve plate shown in FIG. 4.

The valve plate 40 is also disc-shaped as best seen in FIGS. 2, 4 and 5, including a substantially flat upper surface 41 into which the manifold 42 is downwardly formed. The manifold 42 has a generally shallow V-shaped configuration with the apex 44 being located directly under the aperture 32 of support disc 30. At opposite ends of the channnular-shaped manifold, there are formed through the valve plate a first aperture 46 which communicates with the vacuum source 19 when the valve plate 40 is rotated to a container holding position and a second aperture 48 formed through the valve plate for communicating with a vent 78 for equalizing the pressure within manifold 42 when the valve plate is rotated to a container releasing position. Also formed through valve plate 40 is a somewhat larger aperture 50 which captively receives and holds a steel ball 52 which forms the sealing member of the valve and is held within aperture 50 at the top by the support disc 30 resiliently pressing against the surface of the ball 52 from above valve plate 40. The ball 52 rests upon aperture 76 in housing 60 at its lower end as described in greater detail below and as seen in FIG. 8.

The diameter of the generally disc-shaped valve plate 40 is also 3" and conforms to that of the support disc 30 mounted on the upper surface 41 of plate 40. The lower side of valve plate 40 includes a generally disc-shaped land 54 (FIG. 5) having a diameter less than that of the overall diameter of valve plate 40. Extending inwardly from an edge of land 54 is a generally U-shaped arcuate slot 51 which receives a key 61 (FIG. 6) of housing 60 for restricting the angular rotation of the valve plate within housing 60. The disc-shaped land 54 thus extends downwardly from the lower surface 43 of the valve plate into a similar diametered circular recess 66 in housing 60. Centrally located within land 54 is a second downwardly depending disc-shaped land 56 which extends through a circular aperture 67 in member 60 and which receives a looking cap 90 (FIG. 2) for rotatably but captively holding the valve plate 42 to housing 60 as will be described in greater detail below.

While the manifold 42 remains in constant communication with aperture 32 of support disc 30, apertures 46 and 48, depending upon the rotated position of valve plate 40, selectively couple the manifold to the vacuum source 19 or a bleed vent 78 in the housing 60. The arcuate slot 51 formed in the downwardly depending disc-shaped support 54 of valve plate 40 circumscribes an arc of approximately 35 degrees which represents the amount of rotation necessary to change the operation of the container holder from a holding position to a container releasing position. It was discovered that this angle represents a relatively easy amount of rotation which is comfortable for the user and presents a natural motion for opening and closing the valve and is associated with other commonly controlled objects such as door knobs and the like and therefore is a relatively familiar and easily achieved motion. Having described the valve plate, the housing into which the valve plate and support disc are mounted is now described in conjunction particularly initially with FIGS. 6 and 7.

Figure 6:
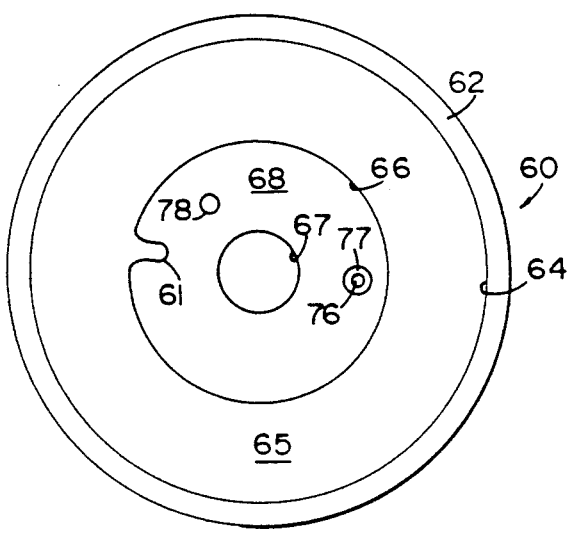
FIG. 6 is a top plan view of the housing for the container holder.
Figure 7:
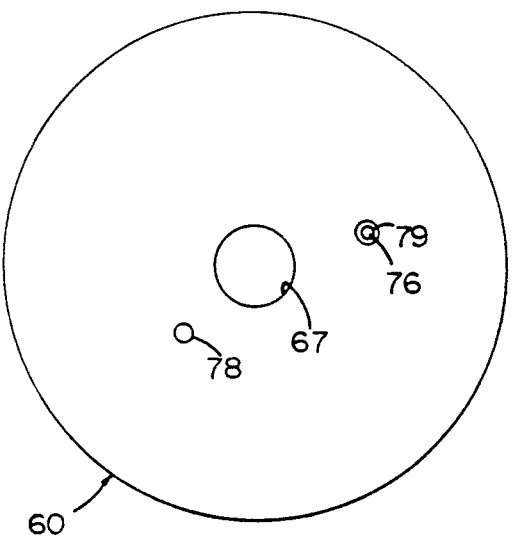
FIG. 7 is a bottom plan view of the housing shown in FIG. 6.

FIG. 6 shows a top plan view of the housing 60 which includes an outer raised circular rim 62 which is substantially flush with the upper surface of the armrest 10 as best seen in FIG. 8. Formed downwardly within the housing is a first circular recess 64 having a disc-shaped floor 65 which mates with the surface 43 of valve plate 40. A central smaller diameter recess 66 is formed downwardly and includes a generally circular shaped floor 68 which mates with the lower surface 47 of valve plate 40. Housing 60 includes a central aperture 67 which receives the circular post 56 of valve plate therethrough and which also receives the upper end 92 of a circular holding plug 90 which has its top surface 91 bonded to the surface 57 of circular post 56 during the assembly process for holding the valve plate within housing 60 and yet allows its free rotation.

Extending inwardly into the circular aperture 66 formed in housing 60 is an index finger 61 which fits within notch 51 of the valve plate and engages the opposite edges of the notch upon rotation of the valve plate to limit the motion of the valve plate between its opposite extremes which correspond to the alignment of apertures 46 and 48 with vacuum supply aperture 76 and a bleed aperture 78 respectively formed through the housing 60. Aperture 78 terminates within the body 14 of the armrest which provides a sufficient space to allow venting of the manifold 42. Aperture 76 includes a conically tapered upper portion 77 for nestably receiving the valve ball 52 therein for selectively blocking off the vacuum line 18 coupled to the vacuum source 19 for disconnecting the vacuum from the manifold 46 when a container is to be raised from the container holder. Line 18 is coupled to a hose fitting 79 (FIG. 8) which communicates with aperture 76 and can be integrally molded as part of housing 60.

The valve plate 40 and housing 60 are molded of a lubricious polymeric material such a PVC, ABS or the like, such that the valve plate can be rotated with respect to the housing even when a vacuum is drawn in the manifold 42. Having described the construction of each of the constituent elements of the vacuum actuated container holder, a description of the operation of the system to selectively hold or release a container thereon is now presented and is best understood with reference to the schematic diagrams of FIGS. 9 and 10 in conjunction with the exploded view of FIG. 2 and the cross-sectional view of FIG. 8.

Figure 9:
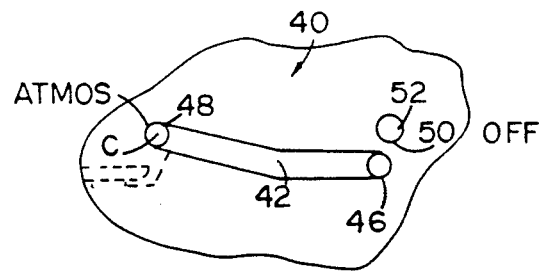
FIG. 9 is a schematic view showing the operation of the valve of the container holder with the valve shown in a first position.

In FIG. 9, the valve plate 40 is shown schematically and in a position in which ball 52, positioned within aperture 50 of the valve plate, is aligned over the aperture 76 of housing 60 such that ball 52 is drawn downwardly into the conical surface 77 or valve seat as also seen in FIG. 8. In this position the ball selectively seals off the vacuum source from the manifold and the lower surface of valve plate 40. In this position, aperture 46 in manifold 42 is rotated to a position aligned with the flat surface 68 of the housing and therefore is a blind aperture. Aperture 48, on the other hand, in this position is in a position rotated to be in alignment with the venting aperture 78 formed in housing 60 and therefore, as indicated by the Arrowhead C in FIG. 9, the vacuum which may have been applied to the container holder support disc surface 22 through manifold 42 is relieved allowing the container to be raised from the support surface 22. If the container had been in a previously held position, its release is achieved by rotating the container clockwise as viewed from the top as indicated by Arrow B in FIG. 1.

Figure 10:
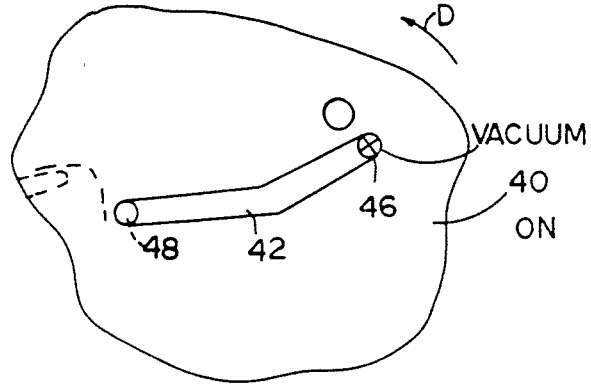
FIG. 10 is a schematic view showing the valve operation with the valve shown in a second position.

When the container is returned to the container holder for holding, it is placed downwardly on the resilient polymeric surface 22 which has a somewhat frictional engagement With the lower surface of the container since it is formed of a resilient polymeric material and therefore the valve plate and support disc 30 thereon can be readily rotated in a counterclockwise direction indicated by Arrow D in FIG. 10 opposite Arrow B in FIG. 1 for holding the container on the armrest.

In this position with the valve plate rotated approximately 35 degrees, the ball 52 is forced out of the conical aperture 76 by the cylindrical side walls of aperture 50 in valve plate 40. The resilient material 31 allows the ball to move upwardly and outwardly and roll across the top surface 68 of housing 60. As the ball is removed from aperture 76, aperture 46 becomes aligned with aperture 76 and a vacuum is applied to manifold 42. At the same time, aperture 48 is no longer aligned with the bleed aperture 78 and therefore a vacuum is applied through manifold 42 and aperture 32 in support disc 30 to the lower surface of the container 26 placed thereon. The guide slot and key 51 and 61 respectively, assures proper alignment of the apertures 46, 48 and associated apertures 76 and 78 respectively of the valve plate and housing to assure the selective application of the vacuum to the lower surface of the container. When the container holder is not in use, the vacuum source 19 can be disconnected using a switch controlling an electrically operated vacuum pump or an electrically actuated pneumatic valve if the vacuum source 19 is one which is used for other applications within the vehicle. In such case, the electrically actuated pneumatic valve would be in series with the supply line 18 at a suitable location.

Although the embodiment described provides operation of a container holder to a holding position by rotating counterclockwise as viewed from the top, it will be apparent that by reversing the vacuum supply and vent the operation of the container holder can be reversed. Also, other valve arrangements can be provided. The rotational system is preferred inasmuch as it is not dependent upon the weight of the container which in the case of Styrofoam cups with little contents, can be relatively light.

Therefore, the system of the present invention will hold containers ranging widely in shape, weight, diameter and material. Thus, the system of the present invention provides a container holder which is insensitive to the weight of the container or the general container bottom shape or material and provides a holding force which is sufficient to hold relatively heavy containers or relatively light weight containers with somewhat fragile bottoms since the resilient surface 22 allows for the sealing of the container or its rim to the support surface defined by the container holder without extreme deflection of the lower surface of the container when, for example, relatively thin wall containers are being held. It will become apparent to those skilled in the art that various modifications to the preferred embodiment of the invention as described herein can be made without departing from the spirit or scope thereof as defined by the appended claims.

The embodiments of the invention in which an exclusive property or privilege is claimed are defined as follows.

I claim:

1. A vacuum actuated container holder comprising:
   a support member having a surface for sealably engaging a lower surface of a container;
   means for mounting said support member to a vehicle; and
   means for selectively applying a vacuum to said support surface for selectively holding a container thereon, said applying means including a ball valve adapted to disconnect the vacuum from said support surface.

2. The apparatus as defined in claim 1 wherein said means for applying a vacuum includes at least one aperture extending through said support member and communicating with said support surface.

3. The apparatus as defined in claim 2 wherein said means for applying a vacuum includes a valve plate coupled to said support member.

4. The apparatus as defined in claim 3 wherein said mounting means comprises a housing for receiving said valve plate therein.

5. The apparatus as defined in claim 4 wherein said valve plate is movably mounted to said housing between first and second positions for controlling vacuum applied to said support surface.

6. The apparatus as defined in claim 5 wherein said means for applying a vacuum includes a vacuum source and coupling said vacuum source to said housing.

7. The apparatus as defined in claim 6 wherein said housing includes a first aperture to which said coupling means is attached and a second aperture vented to the atmosphere.

8. The apparatus as defined in claim 7 wherein said valve plate is rotatably coupled to said housing and includes a pair of spaced apertures extending into a manifold and through said valve plate, said apertures positioned in said valve plate to alternatively selectively align with said first and second apertures of said housing respectively when said valve plate is in said first and second positions.

9. The apparatus as defined in claim 8 wherein said support member is made of a resilient material.

10. The apparatus as defined in claim 9 wherein said resilient material is a cellular foam material.

11. The apparatus as defined in claim 10 wherein said housing, said valve plate, and said support member are generally disc-shaped with said valve plate extending into a circular recess formed into said housing.

12. The apparatus as defined in claim 11 and further including stop means extending between said valve plate and said housing for indexing the motion of said valve plate with respect to said housing between said first and second positions.

13. A vacuum actuated container holder comprising:
- a support member having a surface for sealably engaging a lower surface of a container, said support member being made of resilient cellular foam material;
- means for mounting said support member to a vehicle;
- means for selectively applying a vacuum to said support surface for selectively holding a container thereon, said applying means including at least one aperture extending through said support member and communicating with said support surface, and further including a valve plate coupled to said support member, said mounting means including a housing for receiving said valve plate therein, said valve plate being movably mounted to said housing between first and second pistons for controlling vacuum applied to said support surface, said applying means further including a vacuum source and means coupling said vacuum source to said housing;
- said housing including a first aperture to which said coupling means is attached and a second aperture vented to the atmosphere, said valve plate being rotatably coupled to said housing and including a pair of spaced apertures extending into a manifold and through said valve plate, said apertures being positioned in said valve plate to alternatively selectively align with said first and second apertures of said housing respectively when said valve plate is in said first and second positions, said housing, said valve plate, and said support member being generally disc-shaped with said valve plate extending into a circular recess formed into said housing;
- stop means extending between said valve plate and said housing for indexing the motion of said valve plate with respect to said housing between said first and second positions; and
- a ball valve captively held by said valve plate and selectively movable over said first aperture of said housing to disconnect said vacuum source from said support means.

14. A vacuum actuated container holder comprising:
- a housing including aperture means for coupling said housing to a vacuum source;
- a valve plate including an upper support surface, said upper support surface being adapted to sealingly engage and support the bottom of a container, said valve plate rotatably mounted to said housing, said valve plate including a manifold having a first aperture therein selectively aligned with said aperture in said housing for applying a vacuum to said manifold when said valve plate is in a first position; and
- valve means extending between said valve plate and said housing for selectively restricting said aperture in said housing when said valve plate is rotated to a second position.

15. The apparatus as defined in claim 14 wherein said support surface includes a resilient polymeric member having at least one aperture formed therein communicating with said manifold.

16. The apparatus as defined in claim 15 wherein said housing includes a bleed vent and wherein said manifold includes a second aperture aligned with said bleed vent when said valve plate is rotated to said second position.

17. The vacuum actuated container holder comprising:
- a housing including aperture means for coupling said housing to a vacuum source;
- a valve plate including an upper support surface, said upper support surface being adapted to sealingly engage and support the bottom of a container, said valve plate rotatably mounted to said housing, said valve plate including a manifold having a first aperture therein selectively aligned with said aperture in said housing for applying a vacuum to said manifold when said valve plate is in a first position;
- valve means extending between said valve plate and said housing for selectively restricting said aperture in said housing when said valve plate is rotated to a second position;
- said support surface includes a resilient polymeric member having at least one aperture formed therein communicating with said manifold;
- said housing includes a bleed vent and wherein said manifold housing includes a bleed vent and wherein said manifold includes a second aperture aligned with said bleed vent when said valve plate is rotated to said second position; and
- said valve means including a ball.

18. The apparatus as defined in claim 17 wherein said resilient polymeric material comprises a cellular foam material.

19. A rotatably actuated valve system for a vacuum actuated container holder comprising:
- a valve plate having an elongated manifold formed therein with apertures at opposite ends thereof, said valve plate including means for sealingly supporting a container bottom;
- a housing for rotatably receiving said valve plate, said housing including a first aperture aligned with one of said apertures of said valve plate with aid valve plate in a first rotated position and a second aperture for alignment with said other aperture of said valve plate when said valve plate is rotated to a second position; and valve means captively held by said valve plate and movable therewith for selectively restricting said first aperture of said housing when said valve plate is in said second position.

20. The apparatus as defined in claim 19 and further including means for coupling said first aperture of said housing to a vacuum source.

21. The apparatus as defined in claim 20 wherein said second aperture of said housing defines a bleed vent to the atmosphere such that when said valve plate is rotated to said second position a vacuum in said manifold is relieved.

22. The apparatus as defined in claim 21 wherein said valve plate includes a resilient support member on a side of said plate opposite said housing and wherein said support member includes an aperture communicating with said manifold.

23. The apparatus as defined in claim 22 and further including means for coupling said valve plate to said housing.

24. The apparatus as defined in claim 23 wherein said valve plate is disc-shaped.

25. The apparatus as defined in claim 24 wherein said support member is a resilient polymeric member.

26. The apparatus as defined in claim 25 wherein said polymeric member is made of cellular foam.

* * * * *

UNITED STATES PATENT AND TRADEMARK OFFICE
CERTIFICATE OF CORRECTION

PATENT NO. : 5,316,255
DATED : May 31, 1994
INVENTOR(S) : David P. Marcusen

It is certified that error appears in the above-indentified patent and that said Letters Patent is hereby corrected as shown below:

Column 1, line 57
"Which" should be --which--

Column 4, line 21
"looking" should be --locking--

Column 5, line 13
"a" should be --as--

Column 5, line 48
"With" should be --with--

UNITED STATES PATENT AND TRADEMARK OFFICE
CERTIFICATE OF CORRECTION

PATENT NO. : 5,316,255
DATED : May 31, 1994
INVENTOR(S) : David P. Marcusen

It is certified that error appears in the above-indentified patent and that said Letters Patent is hereby corrected as shown below:

Column 7, Claim 6, line 3
after "source" insert --and means--

Column 7, Claim 13, line 45
"pistons" should be --positions--

Column 8, Claim 17, line 28
"The" should be --A--

Column 8, Claim 19, line 64
"aid" should be --said--

Signed and Sealed this

Twenty-seventh Day of June, 1995

Attest:

BRUCE LEHMAN

*Attesting Officer*     *Commissioner of Patents and Trademarks*